US005148488A

United States Patent [19]

Chen et al.

[11] Patent Number: 5,148,488

[45] Date of Patent: Sep. 15, 1992

[54] METHOD AND FILTER FOR ENHANCING A NOISY SPEECH SIGNAL

[75] Inventors: Walter Y. Chen, Brookside, N.J.; Richard A. Haddad, Tuxedo, N.Y.

[73] Assignee: NYNEX Corporation, White Plains, N.Y.

[21] Appl. No.: 438,610

[22] Filed: Nov. 17, 1989

[51] Int. Cl.[5] .......................... G10L 3/02; G06F 15/31

[52] U.S. Cl. .................................. 381/47; 364/724.19

[58] Field of Search .................................... 381/36–47, 381/94; 364/513.5, 724.01, 724.19, 724.2, 574; 379/410

[56] References Cited

U.S. PATENT DOCUMENTS

| | | | |
|---|---|---|---|
| 3,889,108 | 6/1975 | Cantrell | 364/724.19 |
| 4,185,168 | 1/1980 | Graupe et al. | 381/94 |
| 4,587,620 | 5/1986 | Niimi et al. | 364/574 |
| 4,742,510 | 5/1988 | Quatieri, Jr. et al. | 379/410 |
| 4,757,527 | 7/1988 | Beniston et al. | 379/410 |
| 4,897,878 | 1/1990 | Boll et al. | 381/43 |
| 4,947,425 | 8/1990 | Grizmala et al. | 379/410 |

OTHER PUBLICATIONS

Singer et al, "Increasing the Computational Efficiency of Discrete Kalman Filter", IEEE Transactions on Automatic Control, Jun. 1971, pp. 254–257.

Kalman et al, "New Results in Linear Filtering and Prediction Theory" Journal of Basic Engineering, Mar. 1961, pp. 95–108.

Tazwinski, "Adaptive Filtering", Automatica, vol. 5, pp. 475–485, Pergamon Press, 1969.

Morgan et al., "Real-Time Adaptive Linear Prediction Using The Least Mean Square Gradient Algorithm", IEEE Tranactions on Acoustics, Speech & Signal Processing, 1976, vol. 24 No. 6, pp. 494–507.

B. Widrow et al, "Adaptive Noise Cancelling: Principles and Applications", Proc of IEEE, vol. 63, No. 12, pp. 1692–1716, Dec. 1975.

G. S. Kang and L. J. Fransen, "Experimentatin With an Adaptive Noise-Cancellation Filter", IEEE Trans Circuits and Systems, vol. CAS-34, No. 7, pp. 753–748, Jul. 1987.

D. O'Shaughnessy, "Enhancing Speech Degraded by Additive Noise or Interfering Speakers", IEEE Communications Magazine, Feb. 1989, pp. 46–51.

J. S. Lim and A. V. Oppenheim, "All Pole Modeling of Degraded Speech", IEEE Trans Acous., Speech and Signal Process, vol. ASSP-26, No. 3, pp. 197–210, Jun. 1978.

J. S. Lim and A. V. Oppenheim, "Enhancement and Bandwidth Compression of Noisy Speech", Proc. IEEE, vol. 67, No. 12, Dec. 1979, pp. 1586–1604.

*Primary Examiner*—Michael R. Fleming
*Assistant Examiner*—Michelle Doerrler
*Attorney, Agent, or Firm*—Loren Swingle; Ken Rubenstein

[57] ABSTRACT

A filter for filtering a speech signal to reduce acoustic noise is disclosed. In accordance with the inventive filter, the parameters of an all-pole vocal tract model are first estimated from the noisy signal using a least mean square algorithm as if no noise were present, and then the speech signal is filtered using an approximate limiting Kalman filter constructed according to the estimated parameters.

9 Claims, 2 Drawing Sheets

METHOD AND FILTER FOR ENHANCING A NOISY SPEECH SIGNAL

RELATED APPLICATION

The following applications contain subject matter related to the subject matter of the present application.

1. "Dual Mode LMS Nonlinear Data Echo Canceller" filed on even date herewith for Walter Y. Chen and Richard A. Haddad and bearing Ser. No. 438,598 (now U.S. Pat. No. 4,977,591); and
2. "Dual Mode LMS Channel Equalizer" filed on even date herewith for Walter Y. Chen and Richard A. Haddad and bearing Ser. No. 438,733.

The above-identified related applications are assigned to the assignee hereof.

FIELD OF THE INVENTION

The present invention relates to the filtering of speech signals to reduce acoustic noise.

BACKGROUND OF THE INVENTION

Acoustic noise results from background sounds which interfere with speech sounds to be transmitted. For example, in a cellular mobile telephone environment, acoustic noise may result from background traffic sounds and other road sounds.

The reduction of acoustic noise is important for offline applications such as the enhancement of previously recorded noisy speech. The reduction of acoustic noise is also important for on-line (i.e. real time) applications such as public telephones, mobile phones, or voice communications in aircraft cockpits. In these situations acoustic noise is extremely undesirable.

The reduction of acoustic noise is important in applications where low bit rate speech coding algorithms are utilized. In many cases, a low bit rate speech coding algorithm stems from a model for a speech signal which is based on the physics and physiology of speech production. Because of reliance on such a model for a speech signal, the performance of a speech coding algorithm can be expected to degrade with respect to quality and intelligibility when the speech signal is degraded by acoustic noise.

For this reason, the reduction of acoustic noise is especially important for a cellular mobile telephone system. The design capacity of the cellular mobile telephone system is soon to be filled in many metropolitan areas. A possible solution to increase the system capacity is to convert the current analog voice channel into a digital channel. Such a digital mobile telephone system should provide all potential users with satisfactory service for another decade. In a typical proposed digital mobile telephone system, the bandwidth allocated for each digital voice channel is 15 kHz, corresponding to a digital data rate of 12 kbps. However, the low bit rate coding algorithms which would be utilized in such a mobile telephone system do not work properly under low signal-to-noise ratio conditions.

Two major approaches have previously been utilized to reduce acoustic noise for a speech signal. The first approach is based on the adaptive LMS (least mean square) noise cancellation algorithm (see, e.g., B. Widrow, et al, "Adaptive Noise Cancelling: Principles and Application," *Proc. of IEEE,* Vol. 63, No. 12, pp. 1692–1716, December, 1975; G. S. Kang and L. J. Fransen, "Experimentation with an Adaptive Noise-Cancellation Filter," *IEEE Trans Circuits and Systems,* Vol. CAS-34, No. 7, pp. 753–758, July 1987; D. O'Shaughnessy, "Enhancing Speech Degraded by Additive Noise or Interfering Speakers", *IEEE Communications Magazine,* February 1989, pp. 46–51). The second approach involves a speech model (see, e.g., J. S. Lim and A. V. Oppenheim, "All-Pole Modeling of Degraded Speech," *IEEE Trans. Acous., Speech, and Signal Process.,* Vol. ASSP-26, No. 3, pp. 197–210, June 1978; J. S. Lim and A. V. Oppenheim, "Enhancement and Bandwidth Compression of Noisy Speech," *Proc. IEEE,* Vol. 67, No. 12, December 1979, pp. 1586–1604).

The adaptive LMS noise cancellation technique has proven to be very successful in many applications such as notch filtering, periodic interference cancellation, and antenna sidelobe interference cancellation.

The adaptive LMS noise cancellation technique can be applied to acoustic noise cancellation in a speech signal as follows. An acoustic speech signal y is transmitted over a channel to a first microphone that also receives an acoustic noise signal $n_o$ uncorrelated with the signal y. The combined speech signal and noise $y+n_o$ form a primary input for an adaptive LMS noise canceller. A second microphone receives an acoustic noise $n_1$ correlated with the signal y but correlated in some unknown way with the noise $n_o$. This second microphone provides a reference input for the LMS noise canceller.

In the LMS noise canceller, adaptive filtering is used to process $n_1$ to produce an estimated output noise signal $n_0$ which is as close as possible to the actual noise signal $\hat{n}_o$. The signal $n_o$ is subtracted from $y+n_o$ to produce an enhanced speech output signal $y+n_o-\hat{n}_o$. In a typical application, the characteristics of the channels used to transmit the primary and reference acoustic signals to the primary and reference microphones are not entirely known and are time varying. Accordingly, in the LMS adaptive noise canceller, the error signal $y+\hat{n}_o-n_o$ is used to adaptively adjust the filter coefficients in accordance with an LMS algorithm.

The LM noise cancellation technique does not work properly when there are multiple acoustic noise sources located at different locations or when there is a single noise source with a few reflected images. This result is understandable because the best the adaptive LMS noise cancellation technique can do is identify the differential acoustic transfer function of the speech source to the speech microphone and the reference noise source to the speech microphone. Since only one such transfer function can be estimated by the LMS algorithm, multiple acoustic noise sources cannot be treated using the basic LMS algorithm.

The other approach identified above for the reduction of acoustic noise in a speech signal is based on an all-pole vocal tract model. The all-pole vocal tract model for a speech signal utilizes the basic linear prediction principle. The idea is that a speech sample y(k) can be approximated as a linear combination of the past p speech samples plus an error sample, i.e.

$$y(k)=\Sigma a_i(y-i)+Gu(k) \qquad (1)$$

Illustratively, to eliminate acoustic noise, the model parameters $a_i$ are first estimated using an autocorrelation method as if there is no noise present. Then, the same noisy speech signal is filtered with a non-causal Wiener filter constructed according to the estimated model parameters. This parameter estimation and noisy speech filtering process is repeated several times until a near optimum performance is achieved. This algorithm is effective and can be carried out off-line on a computer or on-line using specially designed hardware. However, in comparison to the conventional LMS noise canceller described above, this technique is far more complicated and is difficult to implement in hardware for on-line applications.

Accordingly, it is an object of the present invention to provide a noise cancellation filtering technique which is suitable for filtering speech signals to remove acoustic noise. More particularly, it is an object of the present invention to provide a noise reduction filtering technique which has the simplicity and speed of the conventional LMS noise reduction scheme for on-line applications, but which has a greater effectiveness such as the filtering technique based on the all-pole vocal tract model described above.

SUMMARY OF THE INVENTION

In accordance with the present invention, an acoustically noisy speech signal is filtered by first estimating the all-pole vocal tract model parameters using an LMS algorithm as if no noise were present, and then filtering the signal using an approximate limiting Kalman filter noise reduction algorithm constructed according to the estimated parameters.

Thus, in comparison to the prior art filter utilizing the all-pole vocal tract speech model described above, in the present invention, an LMS algorithm replaces the autocorrelation method for estimating the all-pole vocal tract model parameters and the limiting Kalman filter noise reduction algorithm replaces the non-causal Wiener filter. Because the LMS algorithm and the substantially similar limiting Kalman filter noise reduction algorithm are so much simpler than their counterparts in the prior art technique, the filter of the present invention can easily be implemented on-line.

It should also be noted that unlike the conventional LMS noise canceller which requires a reference signal, the filter of the present invention receives as its only input the noisy speech signal. In addition, unlike the conventional LMS noise canceller, the filter of the present invention is capable of working in an environment where there is more than one source of acoustic noise.

In an illustrative embodiment and to achieve optimum noise filtering results, the filter of the present invention may comprise a plurality of stages connected sequentially. Each stage includes processing elements for executing an LMS linear predictive model parameter estimation algorithm followed by a processing elements for executing a limiting Kalman filter noise reduction i.e. a modified LMS noise reduction) algorithm.

In an illustrative application, the filtering technique of the present invention can be utilized to enhance a speech signal for a low bit rate speech coding system such as a linear predictive coding system.

DETAILED DESCRIPTION OF THE INVENTION

Before discussing the speech enhancement filter of the present invention in detail, it may be helpful to briefly review the all-pole vocal tract model for a speech signal.

An acoustic speech signal is generated by exciting an acoustic cavity, the vocal tract, by pulses of air released through the vocal cords for voiced sounds (e.g. vowels) or by turbulence for unvoiced sounds (e.g. f, th, s, sh). Thus, a useful model for speech production comprises a linear system representing the vocal tract, which linear system is driven by a periodic pulse train for voiced sounds and random noise for unvoiced sounds.

Figure 1:
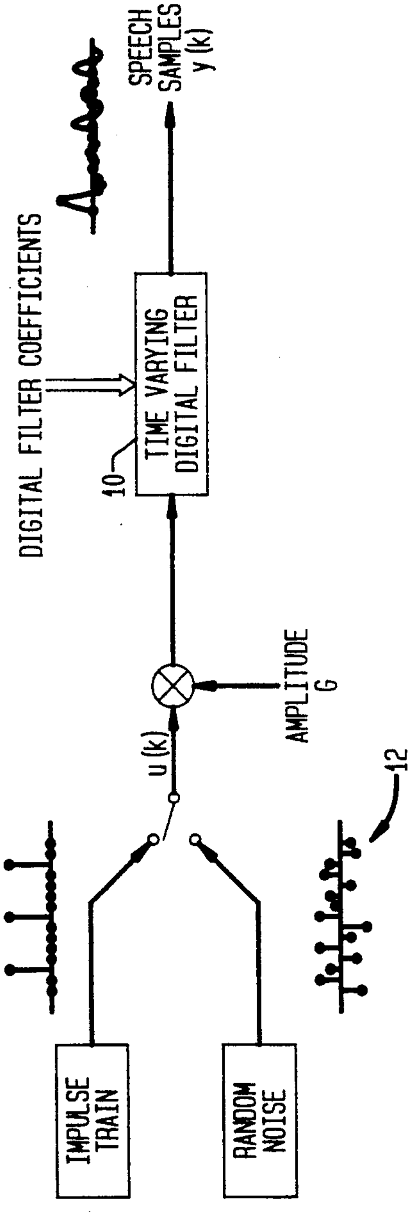
FIG. 1 (PRIOR ART)
FIG 1 schematically illustrates the all-pole vocal tract model for a speech signal.

Such a model for speech production is illustrated in FIG. 1. More specifically, in FIG. 1, the vocal tract is modeled by the time varying digital filter 10. As indicated in FIG. 1, the time varying digital filter 10 has time varying filter coefficients. The filter 10 is excited by the signal Gu(k) Where G is an amplitude factor and k represents a discrete time variable (i.e. a signal f(k) is sampled at the times kT, k=0, 1, 2 . . . where T is a sampling interval). For voiced sounds, the excitation signal u(k) is an impulse train 11 and for unvoiced sounds, the excitation signal u(k) is random noise 12.

In accordance with the all-pole vocal tract model, a speech sample y(k) is assumed to satisfy an equation of the form $$y(k)=\Sigma a_i y(k-i)+Gu(k) \qquad (2)$$

where the parameters $a_i$, i=1, 2 . . . p, are coefficients of the filter 10 and G is an amplitude of the excitation u(k). Equation (2) is referred to as a linear predictive model since the current speech sample y(k) can be viewed as being predicted from a linear combination of p previous speech samples with an error u(k).

The transfer function of the filter 10 is $$H(z) = \frac{1}{1 - \Sigma a_i z^{-i}} \qquad (3)$$

Because the transfer function H(z) includes only poles, the model is known as the all-pole vocal tract model.

Figure 2:
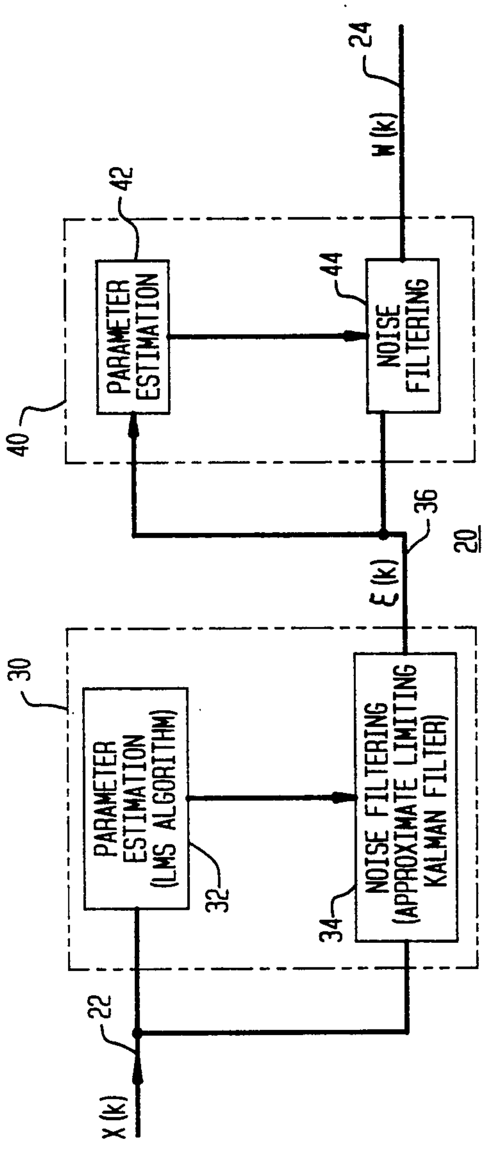
FIG. 2 schematically illustrates the signal processing operations to be carried out by the speech enhancement filter of the present invention.

FIG. 2 schematically illustrates the signal processing operations to be performed by the inventive speech enhancement filter. The only input signal to the filter 20 of FIG. 2 is the noisy speech signal x(k) on line 22. The output of the filter 20 is the filtered speech signal w(k) on line 24.

The filter 20 comprises the stages 30 and 40. Each of the stages 30, 40 performs identical signal processing functions with the output ξ(k) of stage 30 serving as the sole input to the stage 40. In applications where only a relatively small amount of speech enhancement is required, a filter with only a single stage 30 need be utilized. However, for applications where a greater degree of speech enhancement is required, a plurality of stages as shown in FIG. 2 may be utilized.

The input signal to the stage 30 may be modeled as $$x(k)=\xi(k)+v(k) \qquad (4)$$

where ξ(k) is an enhanced speech signal and v(k) noise. Since the noise signal v(k) is in general unknown, the purpose of the stage 30 is to process the signal x(k) to compensate for the noise v(k) and obtain the enhanced speech signal ξ(k).

The signal processing for the stage 30 of FIG. 2 is carried out as follows. In the stage 30, the noisy signal x(k) is processed to obtain the set of all-pole vocal tract model parameters $a_i$ as if no noise were present (box 32), and then the parameters so obtained are used to construct a filter for filtering the noisy input speech signal x(k) (box 34) to produce the enhanced speech signal ξ(k) on line 36.

For further enhancement, the signal ξ(k) is processed by the stage 40. The signal ξ(k) which is the input signal to the stage 40 may be modeled as $$\xi(k)=w(k)+\upsilon(k) \quad (5)$$

where w(k) is a further enhanced speech signal and υ(k) is a noise signal. Since the noise signal υ(k) is unknown, the purpose of the stage 40 is to process the signal ξ(k) to compensate for the noise υ(k) so as to obtain the further enhanced speech signal w(k).

In the stage 40, the signal ξ(k) is processed to obtain a second set of all-pole vocal track model parameters $b_i$ as if no noise were present (box 42), and then the parameters $b_i$ are used to construct filter for filtering the input signal ξ(k) (box 44) to produce the further enhanced speech signal w(k).

In the prior art technique described above, the parameter estimation task is carried out using the autocorrelation method (boxes 32, 42) and the filtering task is carried out by a non-causal Wiener filtering algorithm (boxes 34, 44). The complexity of these algorithms makes implementation of the resulting speech enhancement filter quite difficult and expensive for on-line applications. In addition, it should be noted that while the autocorrelation method has been successful at estimating the model parameters for a speech signal with little noise, the autocorrelation method has not been entirely successful at estimating the parameters from a noisy speech signal.

In contrast, in accordance with the present invention, the parameter estimation task (boxes 32, 42) is carried out using an LMS algorithm and the filtering task (boxes 34, 44) is carried out by an approximate limiting Kalman filtering algorithm. The process is iterative. In each stage 30,40, the model parameters estimated during the $(k-1)^{th}$, iteration of the LMS algorithm are used to construct the approximate limiting Kalman filtering algorithm for filtering the noisy speech signal during the $k^{th}$ iteration. During the $k^{th}$ iteration the values for the model parameters are updated for use by the filtering algorithm during the $(k+1)^{th}$ iteration.

The algorithms utilized in the inventive filter are explained in greater detail below.

In the stage 30, the following LMS algorithms may be executed (box 32) to obtain an estimate for the parameters $a_i$:

$$a_{k+1}=a_k+\mu X_k(x(k)-X_k^T a_k) \quad (6)$$

where μ is the adaptation step size, $a_k$ is the estimated model parameter vector $$a_k=\begin{bmatrix} a_1 \\ \cdot \\ \cdot \\ \cdot \\ a_p \end{bmatrix}_k \quad (7)$$

and $X_k$ is the received signal vector formed from the last p samples of the received noisy speech signal x(k), i.e.

$$X_k=\begin{bmatrix} x(k-1) \\ x(k-2) \\ \cdot \\ \cdot \\ \cdot \\ x(k-p) \end{bmatrix} \quad (8)$$

Alternatively, a slightly more exact LMS algorithm for obtaining the model parameters $a_i$ is given by $$a_{k+1}=(M+\mu\sigma_v^2)a_k+\mu X_k(x(k)-X_k^T a_k) \quad (9)$$

where M is related to the time constant τ of the vocal transfer function and the sampling frequency f=1/T and is given by $$M=e^{-(1/\tau f)} \quad (10)$$

$\sigma_v^2$ is the variance of the noise signal v(k). Illustratively, τ is on the order of 10 milliseconds and the sampling rate f is 10 kHz. Note, however, that caution is necessary in connection with the use of equation (9) since an overestimation of $\sigma_v^2$ will cause the LMS algorithm of Eq (9) to diverge. In a real implementation, the term $(M+\mu\sigma_v^2)$ should be kept near or smaller than one because of the accumulating calculation error which results from a digital signal processor's finite precision mathematical computations.

The approximate limiting Kalman filter (box 34 of FIG. 2) executes the following algorithm:

$$Y_{k+1}=F_{1k}Y_k+\beta K_{1k}(x(k)-a_k^T Y_k) \quad (11)$$

where $$Y_k=\begin{bmatrix} y_1 \\ y_2 \\ \cdot \\ \cdot \\ \cdot \\ y_p \end{bmatrix}_k \quad (12)$$

$$F_{1k}=\begin{bmatrix} a_1 & a_2 \ldots a_p \\ 1 & 0 \ldots 0 \\ 0 & 1 \ldots 0 \\ \cdot & \\ \cdot & \\ \cdot & \\ 0 & \ldots 0\,1\,0 \end{bmatrix}_k \quad (13)$$

-continued $$K_{1k} = \begin{bmatrix} \beta_1 \\ a_1 \\ \cdot \\ \cdot \\ \cdot \\ a_{p-1} \end{bmatrix}_k \tag{14}$$

$$y_{1,k} = \xi(k-1) \tag{15}$$

$$\begin{aligned} \beta &= 1/(E(\Sigma a_i^2) + \sigma\xi^2 + \sigma v^2) \\ \beta_1 &= E(\Sigma a_i^2) + \sigma\xi^2 \\ \sigma\xi^2 &= E(\xi(k)^2) \\ \sigma v^2 &= E(v(k)^2) \end{aligned} \tag{16}$$

E(x) is the expected value or variance of x.

In Eq (11) the gain $K_{1k}$ is the gain of a converged or limiting Kalman filter. This gain may be precalculated. A regular Kalman filter becomes a limiting Kalman filter when the precalculated converged gain is utilized. Thus, a limiting Kalman filter is a sub-optimal approximation of a regular Kalman filter. An LMS algorithm is also a sub-optimal approximation of a regular Kalman filter. Eq (11) for the limiting Kalman filter is also in the form of an LMS algorithm and may be viewed as being a modified LMS algorithm. Thus, each stage of the inventive filter may be viewed as being a dual mode LMS noise reduction filter wherein one LMS-type algorithm is used to estimate the all-pole vocal tract model parameters and a second LMS-type algorithm is used for noise filtering.

The output signal of the stage 30 is $y_{1,k+1}=\xi(k)$ which is the enhanced speech signal.

As indicated above, the stage 40 of FIG. 2 performs the same signal processing functions as stage 30. For purposes of clarity, different variables are used to describe the signal processing algorithms used in the stage 40. The input signal to the stage 40 is $\xi(k)$. As indicated above, $\xi(k)$ may be viewed as being equal to $w(k)+v(k)$ where $\xi(k)$ is a further enhanced speech signal and $v(k)$ is a noise signal.

The stage 40 first processes the signal $\xi(k)$ using an LMS algorithm to estimate a second set of all-pole vocal tract parameters $b_k$ according to the equation $$b_{k+1}=b_k+\lambda\xi_k(\xi(k)-\xi_k^T b_k) \tag{17}$$

where $\lambda$ is an adaptation step size and $$b_k = \begin{bmatrix} b_1 \\ b_2 \\ \cdot \\ \cdot \\ \cdot \\ b_p \end{bmatrix}_k \tag{18}$$

-continued $$\xi_k = \begin{bmatrix} \xi(k-1) \\ \xi(k-2) \\ \cdot \\ \cdot \\ \cdot \\ \xi(k-p) \end{bmatrix} \tag{19}$$

Alternatively, a slightly more exact LMS algorithm for $b_k$ is $$b_{k+1}=(M+\lambda\sigma v^2)b_k+\lambda\xi_k(\xi(k)-\xi_k^T b_k) \quad \text{920)}$$

where M has been defined above and $\sigma_v^2$ is the variance of the noise signal $v(k)$.

To filter the noise component $v(k)$ present in the signal $\xi(k)$, the stage 40 executes a limiting Kalman filter algorithm (box 44) as follows $$Z_{k+1}=F_{2k}Z_k+\alpha K_{2k}(\xi(k)-b_k^T Z_k) \tag{21}$$

where $$Z_k = \begin{bmatrix} Z_1 \\ Z_2 \\ \cdot \\ \cdot \\ \cdot \\ Z_p \end{bmatrix}_k \tag{22}$$

$$F_{2k} \begin{bmatrix} b_1 & b_2 \ldots b_p \\ 1 & 0 \ldots 0 \\ 0 & 1 0 \ldots 0 \\ \cdot & \\ \cdot & \\ \cdot & \\ 0 & \ldots 0 1 0 \end{bmatrix}_k \tag{23}$$

$$K_{2k} = \begin{bmatrix} a_1 \\ b_1 \\ \cdot \\ \cdot \\ \cdot \\ b_{p-1} \end{bmatrix}_k \tag{24}$$

$$\begin{aligned} \alpha &= 1/(E(\Sigma b_i^2) + \sigma_w^2 + \sigma_\mu^2) \\ a_1 &= E(\Sigma b_i^2) + \sigma_w^2 \\ \sigma_w^2 &= E(w(k)^2) \\ \sigma_v^2 &= E(v(k)^2) \end{aligned} \tag{25}$$

The final output signal of the stage 40 is $Z_{1,k}=w(k-1)$.

Figure 3:
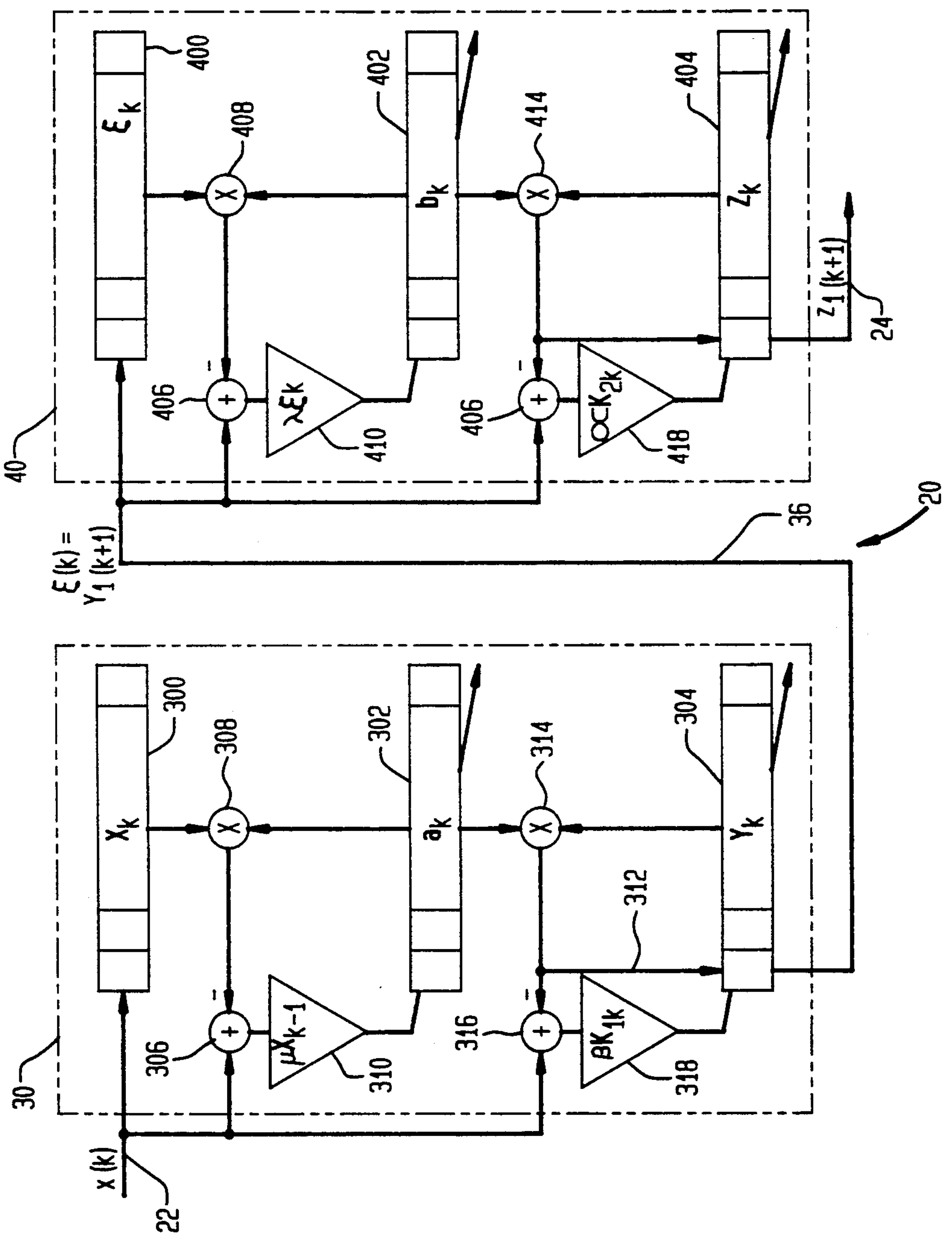
FIG 3 schematically illustrates a circuit implementation of a speech enhancement filter, in accordance with an illustrative embodiment of the present invention.

A schematic circuit diagram of the speech signal enhancement filter 20 of the present invention is shown in FIG. 3. The noisy speech signal x(k) to be filtered arrives at the stage 30 via line 22. The shift register 300 stores the previous p samples of the noisy speech signal x(k) which comprise the vector $X_k$. The non-shift register 302 contains the all-pole vocal tract model parameters which form the vector $a_k$. The shift register 304 stores the vector $Y_k$ which is comprised of p noise reduced speech samples.

In accordance with Eq (6), the current (i.e. $k^{th}$) iteration of $a_k$ is obtained by comparing through use of subtraction unit 306 the current speech sample x(k) and a linear prediction of the current speech sample $a_{k-1}^T X_k$. The linear prediction of the current speech sample is obtained by multiplying through use of the multiplication unit 308 the previous model parameters $a_{k-1}$ stored in non-shift register 302 and the previous noisy speech signal vector $X_{k-1}$ stored in shift register 300. The error signal $x(k)-a_{k-1}^T X_k$ is multiplied by $\mu X_k$ as indicated by the multiplication unit 310 and the resulting products are added to the valµes of $a_{k-1}$ stored in the non-shift register 302 to form $a_k$. In addition, the speech sample x(k−p) previously stored in the right most position of the shift register 300 is thrown away. The remainder of the stored speech samples are moved one position over to the right and the current speech sample x(k) is stored in the left most position of the shift register 300.

Also during the $k^{th}$ iteration, the input to the shift register 304 comprises the predicted current noise reduced speech sample $a_{k-1}^T Y_{k-1}$. The predicted current noise reduced speech sample is formed using the multiplication unit 314 to multiply the p previous noise reduced speech samples forming the vector $Y_{k-1}$ stored in the non-shift register 306 and the previous model parameters $a_{k-1}$ stored in the shift register 302. The reduced noise speech sample in the right most position of the shift register 304 is removed, the remaining reduced noise samples are shifted one unit to the right, and the current predicted reduced noise speech sample $a_{k-1}^T Y_{k-1}$ is stored in the left most position of the shift register 304 via line 312. In accordance with Equation (11), all the reduced noise samples stored in the shift register 304 are then adjusted by forming the predictive error $x(k)-a_{k-1}^T Y_{k-1}$ through use of the subtraction unit 316 and multiplying the predictive error by $\beta K_{1k-1}$ as indicated by multiplication unit 318. The resulting quantities are then added to the samples stored in the shift register 304 to form the vector $Y_k$. The output of the processing stage 30 is $y_{1,k}=\xi(k-1)$ on line 36. The remainder of the values comprising $Y_k$ are still necessary for prediction purposes.

The signal $\xi(k)$ forms the input to the stage 40. As indicated above, the stage 40 performs the identical signal processing operation on the stage 30. Thus, the shift register 400 stores the vector $\xi k$ which comprises the last p samples of the input signal $\xi(k)$. The non-shift register 402 stores the second set of all-pole vocal tract model parameters $b_k$ and the shift register 404 stores the further reduced noise samples which form the vector $Z_k$. The multiplication unit 408 is used to form the linear predictive current speech sample for the $k^{th}$ iteration $b_{k-1}^T \xi_k$. The linear predictive current speech sample is compared with the actual current speech sample using the subtraction unit 406 to form the error quantity $\xi(k)-b_{k-1}^T \xi_k$. The error quality is then multiplied by $\lambda \xi_k$ as indicated by multiplication unit 410 to form the vector $b_k$ in accordance with equation (7). Similarly, the predictive current noise reduced speech sample $b_{k-1}^T Z_{k-1}$ is formed using the multiplication unit 414 and stored in the left most position of the shift register 404. In addition, the error quantity $\xi(k)-b_{k-1}^T Z_{k-1}$ is formed using the subtraction unit 416. In accordance with equation (21) above, this error quantity is then multiplied by $\alpha K_{2k}$ as indicated by the multiplication unit 416 to form the reduced noise speech signal vector $Z_k$. The output of the filter 20 is $Z_{1,k+1}=w(k)$ on line 450.

Some typical parameters for use in a first stage of inventive speech enhancement filter of the present invention are as follows for an input signal with a signal-to-noise ratio of about 10 dB:

$p=10$
$\mu=0.025$
$\beta=1/(E(\Sigma a_i^2)+\sigma_\xi^2+\sigma_v^2=0.1159$
$\beta_1=E(\Sigma a_i^2)+\sigma_\xi^2=8.063$
$E(\Sigma a_i^2)=2.3808$
$\sigma_\xi^2=5.6822$
$\sigma_v^2=0.56822$ In this example, the signal-to-noise improvement resulting from filtering an input signal with 10 dB signal-to-noise ratio may be up to 2.4 dB so that the output signal of the first stage has a 12.4 dB signal-to-noise ratio.

Similarly, typical parameters for use in a second stage of the inventive speech enhancement filter are as follows for an input signal with a 12.4 dB signal-to-noise ratio.

$p=10$
$\lambda=0.025$
$\alpha=1/(E(\Sigma b_i^2)+\sigma_w^2+\sigma_v^2=0.1258$
$\alpha_1=E(\Sigma b_i^2)+\sigma_w^2=8.063$
$E(\Sigma b_i^2)=2.3808$
$\sigma_v^2=0.4543$ The overall signal-to-noise improvement from the two stages may be up to 4.2 dB so that the output signal from the second stage has a signal-to-noise ratio of 14.2 dB.

In short, a filter for enhancing a speech signal by filtering acoustic noise has been disclosed. Illustratively, the filter comprises a plurality of stages arranged sequentially so that the output of one stage forms the input of the next stage. At each stage, an LMS algorithm is used to estimate all-pole vocal tract model parameters from the noisy speech input signal and a limiting Kalman filter constructed from the model parameters is used to filter the noisy speech input signal.

Finally, the above-described embodiments of the invention are intended to be illustrative only. Numerous alternative embodiments may be devised by those skilled in the art without departing from the spirit and scope of the following claims.

We claim:

1. A method to be carried out on line for enhancing a noisy speech signal comprising the steps of in a first time domain filtering step, applying an adaptive least means square algorithm to said noisy speech signal to obtain a set of model parameters from said noisy speech signal, and in a second time domain filtering step, utilizing said model parameters to apply an approximate limiting Kalman filtering algorithm to said noisy speech signal on line to obtain an enhanced speech signal.

2. A method for enhancing a discrete noisy speech signal comprising the steps of in a first discrete time domain filtering step, applying an adaptive least mean square algorithm to said discrete noisy speed signal to obtain a set of model parameters from said discrete noisy speech signal, and in a second time domain filtering step, utilizing said model parameters to apply an approximate limiting Kalman filtering algorithm to said noisy speech signal to obtain an enhanced speech signal, wherein said least mean square algorithm and said approximate limiting Kalman filtering algorithm are iterative and wherein the model parameters obtained during the $(k-1)^{th}$ iteration are used to apply the approximate limiting Kalman filtering algorithm during the $k^{th}$ iteration, where $k=0, 1, 2, 3, \ldots$ 3. The method of claim 1 wherein said method further comprises the steps of applying a second adaptive least square algorithm to said enhanced speech signal to obtain a second set of model parameters, and utilizing said second set of model parameters to apply a second approximate limiting Kalman filtering algorithm to said enhanced speech signal to obtain a further enhanced speech signal.

4. A method for enhancing a noisy speech signal comprising the steps of in a first time domain filtering step, applying an adaptive least mean square algorithm to said noisy speed signal to obtain a set of model parameters from said noisy speech signal, and in a second time domain filtering step, utilizing said model parameters to apply an approximate limiting Kalman filtering algorithm to said noisy speech signal to obtain an enhanced speech signal, wherein said method further includes the step of coding said enhanced speech signal using a linear predictive coding algorithm.

5. A method to be carried out on-line for enhancing a discrete noisy signal comprising the steps of in a first discrete time domain filtering step, applying an adaptive least mean square algorithm to said discrete noisy speed signal to obtain a set of linear predictive parameters characteristic of said discrete noisy speech signal, and in a second time domain filtering step, utilizing said linear predictive parameters to apply a limiting Kalman filter to said discrete noisy speech signal on-line so as to enhance said discrete noisy signal.

6. A filter for the on-line enhancing of a noisy speech signal comprising first time domain filter means utilizing an adaptive least mean square algorithm for obtaining a set of model parameters from said noisy speech signal, and second time domain filter means including limiting Kalman filter means utilizing said model parameters for filtering said noisy speech signal on-line to obtain an enhanced speech signal from said noisy speech signal.

7. A filter for enhancing a discrete noisy speed signal comprising first discrete time domain filtering means utilizing an adaptive least mean square algorithm for obtaining a set of model parameters from said noisy speech signal, and second time domain filter means including limiting Kalman filter means utilizing said model parameters for filtering said discrete noisy speech signal to obtain an enhanced speech signal, wherein said model parameters are all-pole vocal tract model parameters.

8. A filter for enhancing a discrete noisy speech signal in real time comprising a first stage comprising first discrete, time domain filtering means utilizing a first least mean square algorithm for obtaining a first set of all pole vocal tract model parameters from said discrete noisy speech signal and second discrete, time domain filtering means including a first limiting Kalman filter utilizing said first set of model parameters for filtering said discrete noisy speech signal in real time obtain a first enhanced speech signal, and a second stage comprising third discrete time domain filtering means utilizing a second least mean square algorithm for obtaining a second set of all pole vocal tract model parameters from said first enhanced speech signal and fourth discrete time domain filtering means including a second limiting Kalman filter utilizing said second set of model parameters for filtering said first enhanced speech signal in real time to obtain a second enhanced speech signal.

9. A filter for the on line enhancing of a noisy signal comprising first time domain filter means for applying an adaptive least mean square algorithm to said noisy signal to obtain a set of linear predictive parameters characteristic of said noisy signal, and second time domain filter means including a limiting Kalman filter means utilizing said parameters for filtering said noisy signal on-line so as to enhance said noisy signal.

* * * * *